UNITED STATES PATENT OFFICE.

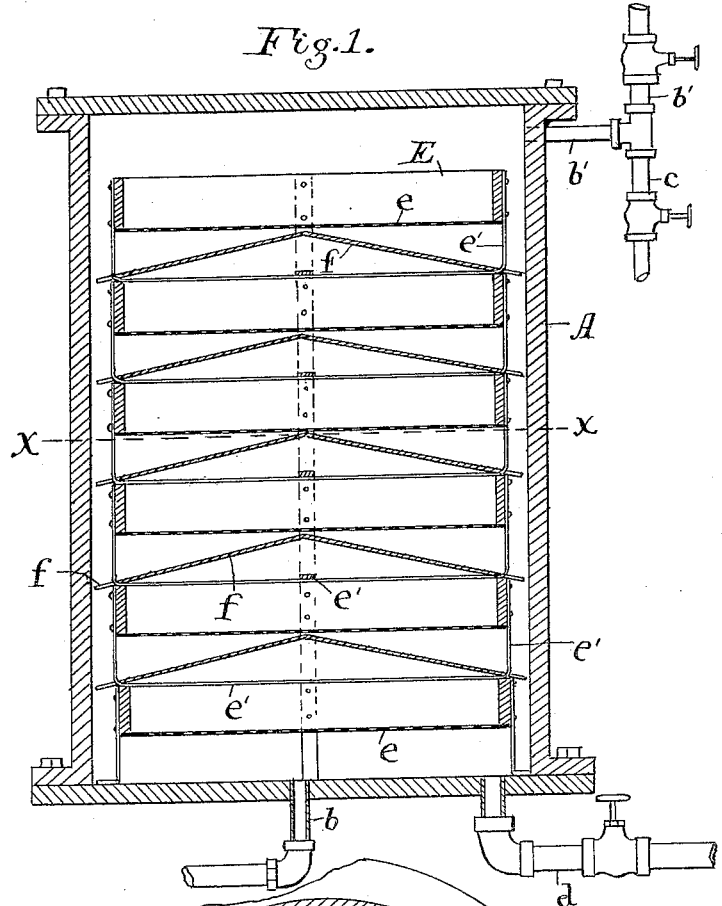
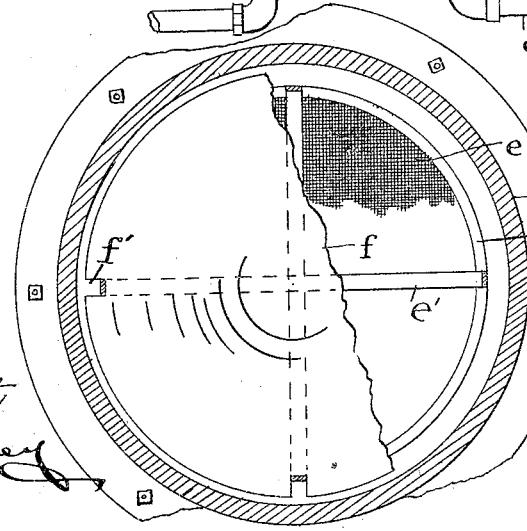

SILAS B. ADAMS, OF PORTLAND, MAINE.

APPARATUS FOR STRAINING GUM.

No. 804,911.     Specification of Letters Patent.     Patented Nov. 21, 1905.

Application filed March 18, 1905. Serial No. 250,738.

*To all whom it may concern:*

Be it known that I, SILAS B. ADAMS, a citizen of the United States of America, and a resident of Portland, county of Cumberland, State of Maine, have invented certain new and useful Improvements in Apparatus for Straining Gum, of which the following is a specification.

My invention relates to the straining and purifying of gums of various kinds; but it relates particularly to straining spruce-gums and separating the wood, bark, and other impurities contained therein.

The object of my invention is to construct an apparatus in which I may use the shallow strainers and at the same time be able to handle large quantities at one time. With this end in view I place a series of shallow trays one on top of another in the retort, with inclined diaphragms between the trays for receiving the strained product and conducting it beyond the edges of the trays or to a common point, from which it can be drawn in a body from the bottom of the retort.

I illustrate my invention by means of the accompanying drawings, in which—

Figure 1 is a vertical section, and Fig. 2 is a horizontal section on the line $x\ x$.

A represents a retort of any suitable size, with a steam-supply pipe $b$, a blow-off pipe $b'$ at or near the top, and a water-pipe $c$ for introducing water for washing out the retort. A suitable pipe $d$ is provided at the bottom for drawing off the products. The gum is strained in a series of shallow trays E, which are placed one on top of another until the retort is filled, or nearly so. These trays have perforated bottoms $e$, made of wire-cloth or other suitable material, according to the nature of the gum to be strained. Between the trays are inclined diaphragms for the purpose of catching the strained product and conducting it to a common point.

As here shown, I use a series of shallow conical diaphragms $f$, each of which is attached to the tray above it, so that the two together constitute the unit, which may be multiplied to any extent. These diaphragms are somewhat larger in diameter than the trays, so that the strained gum will run clear of the trays and down the sides of the retort to the bottom, where it will collect and from which it may be withdrawn.

The diaphragms are attached to the trays by means of metal straps $e'$, which are secured at the outside of each tray and extend downward to the top of the next tray below and thence across the tray and up to the opposite side. Notches $f'$ are formed in the edges of the diaphragms, through which notches the straps pass, thus confining the diaphragm to the tray above it.

The lower tray rests on suitable legs, which bring it above the bottom of the retort, giving space for the accumulation of the strained gum.

In using my apparatus the trays are filled with crude gum and placed one on top of the other in the retort, as shown. Steam is then admitted, and the strained gum dropping down upon the inclined diaphragms runs down the sides of the retort to the bottom and is there drawn off through the discharge-pipe $d$. When all the gum has been drawn off, the steam is blown off through the blow-off pipe, the trays removed, and the retort may be washed out by admitting water through the water-pipes $c$.

It will be seen that with my apparatus I am able to handle large quantities of gum at one time without the use of deep trays or strainers, and in practice I find the apparatus a very valuable one as compared with the old form. The gum can be spread in these trays in a thin layer, so that it is practically all separated from the impurities which it contains.

I claim—

1. The herein-described apparatus for straining gums or other like products consisting of a retort having therein a series of shallow trays with perforated bottoms placed one on top of another, with inclined diaphragms between them arranged to deliver the strained product at a common point and means for supplying steam to said retort and drawing off the product.

2. The herein-described apparatus for straining gums or other like products consisting of a retort having therein a series of shallow trays with perforated bottoms placed one on top of another, with conical diaphragms interposed between them adapted to deliver the strained product at the sides of the retort and outside of the trays and means for supplying steam to said retort and drawing off the product.

3. The herein-described apparatus for straining gums and other like products consisting of a retort having therein a series of shallow trays with perforated bottoms placed one on top of another each of said trays except the lower having a shallow conical diaphragm immediately beneath it and secured to it, the edges of said diaphragm being beyond the edges of the tray and means for admitting steam to said retort and drawing off the product.

4. The herein-described apparatus for straining gums and other like products consisting of a retort having therein a series of shallow trays with perforated bottoms placed one on top of another, each of said trays except the lower having a shallow conical diaphragm immediately beneath it with metal straps secured to the sides of the tray and passing beneath said diaphragm to secure it to the tray and to provide a support for the same, with means for admitting steam to said retort and for drawing off the product.

Signed at Portland this 10th day of March, 1905.

SILAS B. ADAMS.

Witnesses:
S. W. BATES,
CHARLOTTE M. GODFREY.